United States Patent [19]
Kamperman

[11] Patent Number: 5,991,400
[45] Date of Patent: Nov. 23, 1999

[54] TIME-SHIFTED CONDITIONAL ACCESS

[75] Inventor: Franciscus L.A.J. Kamperman, Eindhoven, Netherlands

[73] Assignee: U.S. Philips Corporation, New York, N.Y.

[21] Appl. No.: 08/741,155

[22] Filed: Oct. 29, 1996

[30] Foreign Application Priority Data

Oct. 31, 1995 [EP] European Pat. Off. .............. 95202980

[51] Int. Cl.⁶ ...................................................... H04L 9/00
[52] U.S. Cl. .................................................................. 380/9
[58] Field of Search ................................... 380/9, 13, 19; 370/358

[56] References Cited

U.S. PATENT DOCUMENTS

| | | | |
|---|---|---|---|
| 4,485,468 | 11/1984 | Slana | 370/358 |
| 4,727,579 | 2/1988 | Wright et al. | 380/20 |
| 4,817,143 | 3/1989 | Murray | 380/20 |
| 4,937,866 | 6/1990 | Crowther et al. | 380/20 |
| 5,224,161 | 6/1993 | Daniel et al. | 380/14 |
| 5,243,650 | 9/1993 | Roth et al. | 380/19 |
| 5,249,229 | 9/1993 | Poivet et al. | 380/14 |
| 5,530,756 | 6/1996 | Bourel et al. | 380/20 |
| 5,588,058 | 12/1996 | Le Berre | 380/20 |
| 5,689,559 | 11/1997 | Park | 380/3 |

FOREIGN PATENT DOCUMENTS 2132860  7/1984  United Kingdom .

OTHER PUBLICATIONS

"Encipherment and Conditional Access" by L.C. Guillou and J.L. Giachetti, published in the SMPTE Journal of Jun. 1994.

*Primary Examiner*—Salvatore Cangialosi
*Attorney, Agent, or Firm*—Michael E. Belk

[57] ABSTRACT

In a conditional access system, transmitted information is recorded in a scrambled form SV. Accordingly, any access to the recorded information SV is subject to the condition that proper control word(s) CW are available. To enable access to the recorded information SV, control word regeneration data ECM, KRD is stored. The proper control word(s) CW cannot easily be derived from this control word regeneration data ECM, KRD. However security device SCD is capable of retrieving the proper control word(s) CW from the control word regeneration data ECM, KRD. A system operator effectively masters operations carried out in the security device SCD. Accordingly, if the system operator so desires, he may inhibit retrieval of the control word(s) CW and, consequently, prevent access to the recorded information SV. The conditional access system may be used in, for example, pay-TV or multimedia purposes.

17 Claims, 4 Drawing Sheets

TIME-SHIFTED CONDITIONAL ACCESS

BACKGROUND OF THE INVENTION

The invention relates to a conditional access system comprising:

a descrambler for converting scrambled information into descrambled information in dependence upon control words; and a security device for managing a supply of the control words to the descrambler.

Such a system may be used, for example, in television broadcasts to make certain television channels, or programs only, accessible to those viewers who pay for these services, i.e. to realize pay-TV. The invention may also be used in many multimedia applications.

The article "Encipherment and Conditional Access" by L. C. Guillou and J.-L. Giachetti, published in the SMPTE Journal of June 1994, describes various conditional access systems of the type described above for use in television broadcasts. In the known system, a video signal is transmitted in a scrambled form to a receiver. The receiver comprises a descrambler, which descrambles the transmission signal, in order to retrieve the original video. Both scrambling and descrambling are effected under the control of a control word. Together with the scrambling algorithm used the control word, determines the relation between the scrambled and the original video. Thus, the scrambled video can only be transformed back into the original video signal if the proper control word is available. Access to the original video at a receiving end is therefore limited to access to the control word.

To enhance the robustness of a conditional access system, the following measures are taken. First, the control word is changed regularly. Secondly, the control word is transmitted in an encrypted form to the receiving end. Accordingly, the receiving end comprises a decrypter to retrieve the original control word. Thirdly, the decrypter is implemented in such a way that it requires a key, as input data, so as to effect decryption. Together with the key, the decryption algorithm, in according with which the decrypter operates, determines the relation between the original control word and the encrypted control word.

FIGS. 2 to 5 of the SMPTE article show examples of conditional access systems which employ the three aforementioned measures. In FIG. 2 of the SMPTE article, the encrypted control word, referred to as Management Message, is sent monthly to a receiving end by mail. The key, which is used to decrypt the received encrypted control word, is a distribution key. The distribution key varies from one receiving end to another. Thus, in the FIG. 2 system, both the encrypted control word and the key for decrypting the encrypted control word are personalized.

In the systems shown in FIGS. 3, 4 and 5 of the SMPTE article, encrypted control words and keys for decrypting the control words are not personalized. For example, together with the scrambled video, the encrypted control words may be transmitted in the form of an entitlement control message (ECM). This means that various receiving ends receive the same entitlement control messages ECM comprising the same encrypted control word. Accordingly, various receiving ends use the same key for retrieving the original control word. The common key for decrypting the entitlement control messages ECMs is referred to as authorization key AK. The authorization key AK and the decryption algorithm represent the entitlement at the receiving end.

The authorization key AK is sent in an encrypted form as an entitlement management message (EMM) to the various receiving ends. At a receiving end, a distribution key is used for decrypting the entitlement management message EMM. Distribution keys are typically diversified, that is, they vary from one receiving end to another, or from one group of receiving ends to another group of receiving ends. Consequently, the entitlement management message EMM can be personalized. Additionally, the authenticity of the entitlement management message EMM is to be checked at the receiving end, so as to recognize the voice of the "master". The "master" will be further referred to as service provider, for example, the broadcaster of the scrambled video.

In the FIG. 3, 4 and 5 systems of the SMPTE article, control words generally have a large number of bits (typically 60 bits) and a short life span (typically 10 sec). This means that every 10 sec a new encrypted control word, in the form of an entitlement control message ECM, is transmitted to the receiving ends. For security reasons, the authorization key AK is also modified from time to time. The authorization key AK is updated by entitlement management messages EMM which convey encrypted authorization keys AK.

In the systems described in the cited SMPTE article, each receiving end comprises a security device. The security device performs operations which relate to the entitlement of a receiving end, i.e. it executes pay TV operator commands. The operations include decryption of encrypted control words and, if appropriate, decryption of entitlement management messages EMM. The security device may also perform other operations concerning conditions which limit the right of access. Such conditions are, for example, a subscription period, a pre-booked program, a credit for impulse accesses, etc.

The security device may be implemented in various ways. Generally, the security device will comprise a microcomputer. The security device may be fixed to the descrambler, and even integrated with the descrambler, to form one unit. Alternatively, the security device may be a smart card, which is detachable from a receiving unit comprising the descrambler. The latter option is sufficiently secure, when the control word has enough bits and a sufficiently short life. In any implementation, the security device should be tamper-resistant, either physically or electronically, for reasons of security.

SUMMARY OF THE INVENTION

It is an object of the invention to provide a conditional access system of the type, described above, giving the system operator a more extensive control of any access to the transmitted information.

In accordance with an aspect of the invention, such a system is characterized in that the system comprises:

means for supplying control word regeneration data, unequal to the control words, to a storage medium, in association with a recording of scrambled information, and in that the security device comprises:

means for retrieving the control words from the control word regeneration data, which is read from the storage medium, in association with a supply of the recorded scrambled information to the descrambler.

Other aspects of the invention relate to a security device, a recording medium and a method of time-shifted conditional access, substantially in line with the above-defined conditional access system. Additional features are defined in the dependent Claims.

The invention takes the functionality of time-shifted access to secure information into consideration, which the SMPTE article does not. All conditional access systems described in the cited SMPTE article are focused on preventing unauthorized access to information at the time of transmission of this information, or briefly, direct access. However, at each entitled receiving end, the descrambled information can be recorded, for example, on a tape. The pay-TV operator has no real control of the recorded information, which can be freely accessed by unauthorized persons.

For example, in an apartment building a resident who has subscribed to a scrambled television (TV) channel, can record a program on this channel in a descrambled form. Subsequently, he can hand over this recording to other residents, who are not subscribers, but who would like to see the programs. Moreover, if the descrambled program is not copy-protected, there is nothing to physically prevent copies being made of the recorded programs. These copies can then be distributed to various residents such as, for example, those who do not need to subscribe to the TV channel concerned to view its programs whenever they like.

The advent of digital television broadcasting makes the foregoing a bigger problem for pay-TV operators. When a program is broadcast, for example as MPEG-2 digital video, and the MPEG-2 digital video of this program is recorded, the recording will provide substantially the same picture and sound quality as the broadcast. When stripped of any copy protection, the program can be copied an indefinite number of times, without any significant loss of quality. In other words, each receiving end in a pay-TV system is a potential owner of a pirate master of a pay-TV program which has been broadcast. In a digital pay-TV system, the pirate master is as good, or nearly as good as, the official master of the pay-TV operator.

In a conditional access system according to the invention, the information transmitted remains under the control of the system operator, if he so desires. For example, the system operator can determine the number of times the recorded information may be accessed, the period during which the recorded information may be accessed, the receiving ends at which the recorded information may be accessed, etc. Thus, the invention adds a time shift information access functionality to the known conditional access systems, while avoiding that this functionality substantially affects the security of these systems.

These and other aspects and advantages of the invention will be apparent from and elucidated with reference to the embodiments described hereinafter.

DETAILED DESCRIPTION OF THE PREFERRED EMBODIMENTS

The invention will hereinafter be explained in greater detail by means of an application in a pay-TV system. First, functional elements of the pay-TV system, shown in FIG. 1, will be discussed. Secondly, three implementations of the FIG. 1 pay-TV system will be described, in which implementations the system operates differently. FIGS. 2a, 2b, FIGS. 3a, 3b and FIGS. 4a, 4b illustrate operations in the three respective implementations. Thirdly, advantageous effects in the pay-TV system, provided by the invention, will be highlighted. Fourthly, some alternative embodiments will be dealt with, so as to indicate that the scope of the invention claimed is well beyond the pay-TV system presented hereinafter by way of example.

Figure 1:
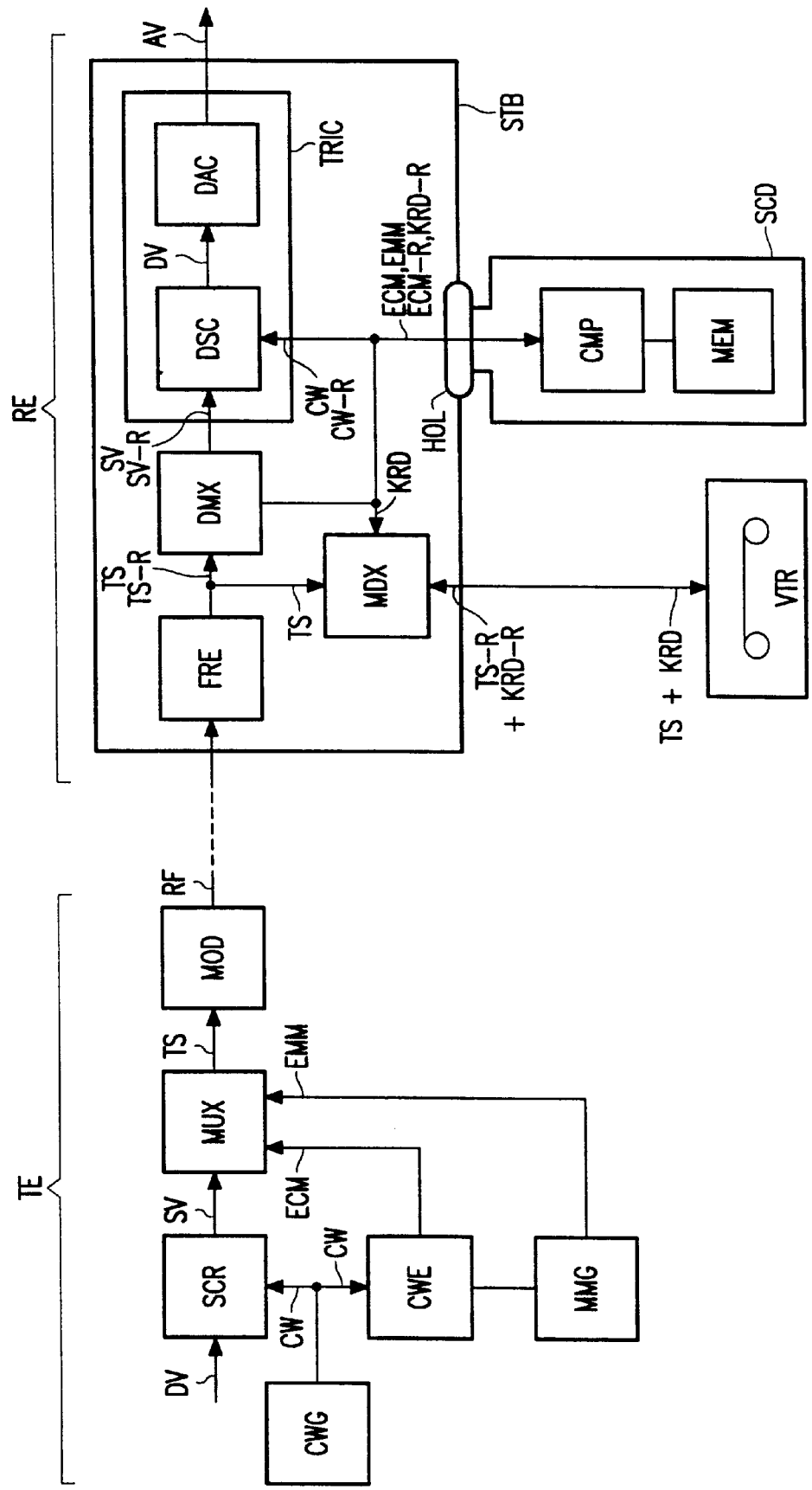
FIG. 1 is a block-schematic diagram of an embodiment of a conditional access system according to the invention.

In the FIG. 1 pay-TV system, a transmitting end TE conveys pay-TV programs in a scrambled form to the receiving end RE. The receiving end RE has a video tape recorder VTR to enable viewing of any transmitted pay-TV program at a time later than the time of transmission. This is further referred to as time-shifted viewing. The receiving end further comprises the following units: a settop box STB and a detachable security device SCD, for example a smart card. The settop box STB has a holder HOL for physically and electrically coupling the security device SCD thereto.

At the transmitting end TE, a scrambling device SCR scrambles a digital video signal DV, for example MPEG-2 encoded video, to obtain a scrambled video signal SV. The scrambling depends on a control word CW, which is generated by a control word generator CWG. Hence, the relation between the digital video signal DV and the scrambled video signal SV is determined by the control word CW and the scrambling algorithm used. The control word CW provided by the control word generator frequently changes, for example every 10 seconds.

A control word encrypter CWE and a management message generator MMG provide data is needed for descrambling at the receiving end RE. More specifically, the control word encrypter CWE provides the control words CW in an encrypted form, which words are included in entitlement control messages ECM. The management message generator MMG provides an authorization key AK in an encrypted form, which key is included in an entitlement management message EMM. The authorization key AK is needed to retrieve the control words from the entitlement control messages ECM.

The entitlement control messages ECM are at least as frequent as the changes in the control words CW. For example, every 10 seconds an entitlement control message ECM, which comprises a new control word CW, is conveyed to the receiving end. However, the authorization key AK for descrambling control words CW changes much less frequently than the control words CW, for example, only once a week or month. Accordingly, entitlement management messages EMM are much less frequent than entitlement control messages ECM. Thus, during a television program, for example, a multitude of entitlement control messages ECM is conveyed to the receiving end RE, whereas no entitlement management message EMM is conveyed at all.

A multiplexer MUX combines the scrambled video signal SV with the entitlement control messages ECM and the entitlement management message EMM, to one transport stream TS. The transport stream TS is supplied to a modulator MOD, which provides a transmission signal RF.

The settop box STB, at the receiving end RE, comprises the following functional parts: a front end FRE, a demultiplexer DMX, a multiplexer/demultiplexer MDX, a descrambler DSC and an analog-to-digital (A/D) converter ADC. The front end FRE derives the transport stream TS from the transmission signal RF. The transport stream TS is supplied to a demultiplexer DMX, which separates the various types of information included in the transport stream TS. Accordingly, the scrambled video signal SV is isolated from the entitlement control messages ECM and the entitlement management messages EMM. The multiplexer/demultiplexer MDX is an interface for the video tape recorder VTR. It will be discussed in greater detail below.

The descrambler DSC receives the scrambled video signal SV and a control word CW from the security device SCD. With the proper control word CW, the descrambler DSC converts the scrambled video signal SV into the digital video signal DV, which has been supplied to the scrambler SCR at the transmitting end. A digital-to-analog (D/A) converter DAC converts the digital video signal DV into an analog video signal AV, suitable for supply to a picture display device (not shown). The descrambler DSC and the D/A converter DAC are housed in a tamper-resistant integrated circuit TRIC. Accordingly, digital recording of any pay-TV program is hindered, because the digital video signal DV cannot be easily accessed.

The security device SCD decrypts the entitlement control messages ECM and entitlement management message EMM supplied thereto by the demultiplexer DMX. The decryption of the entitlement management message EMM provides the authorization key AK which is needed to decrypt the entitlement control messages ECM and/or further data relating to the entitlements of the receiving end RE. Decryption of the entitlement control messages ECM provides the control words CW, which the descrambler DSC requires in order to retrieve the digital video signal DV.

The security device SCD comprises a microcomputer CMP and a memory MEM for performing the above operations and for storing the results thereof. The memory MEM has a writable section in which a current control word CW, which is derived from the most recent entitlement control message ECM, can be stored. Furthermore, the authorization key AK for decrypting the entitlement control messages ECM is stored in the writable section, until a new entitlement management message EMM is received. The memory MEM may further have a read-only section in which, for example, a decryption algorithm is stored.

The video tape recorder VTR receives an input signal for recording from the multiplexer/demultiplexer MDX. The input signal comprises the transport stream TS. Thus, the video tape recorder VTR may digitally record any pay-TV program in a scrambled form, together with the accompanying entitlement control messages ECM. When the recorded pay-TV program is played back, a recorded transport stream TS-R is supplied to the demultiplexer DMX, via the multiplexer/demultiplexer MDX. Accordingly, the demultiplexer DMX will supply recorded entitlement control messages ECM-R to the security device SCD and a recorded scrambled video signal SV-R to the descrambler DSC.

However, if only the transport stream TS is recorded, the following problem may occur in trying to view the recorded pay-TV program. At the time the recorded pay-TV program is played back, an entitlement management message EMM may have been conveyed to the security device SCD since the time when the recording was made. In that case, the authorization key AK, which was valid during at the time of recording, has been replaced by a new authorization key. Consequently, the security device SCD will not be able to retrieve proper control words CW from the recorded entitlement control messages ECM-R supplied thereto.

In the FIG. 1 pay-TV system, the security device SCD provides key-related data KRD, when the pay-TV program is recorded. The key-related data KRD is combined with the transport stream TS in the multiplexer/demultiplexer MDX and, subsequently, supplied to the video tape recorder VTR. When the recorded pay-TV program is played back, the recorded key-related data KDR-R returns to the security device SCD via the multiplexer/demultiplexer MDX. The security device SCD uses the key-related data KRD, to reinstall the authorization key which was valid at the time of recording. Accordingly, the recorded entitlement control messages ECM-R can be decrypted, such that control words CW-R, proper to the recording, are supplied to the descrambler DSC during play-back.

Three implementations of the FIG. 1 pay-TV system, in which the key-related data KRD differs in nature are described below. However, all three implementations have in common that it is difficult, if not impossible, for any unauthorized person to derive the correct authorization key AK from the key-related data KRD.

Figure 2A:
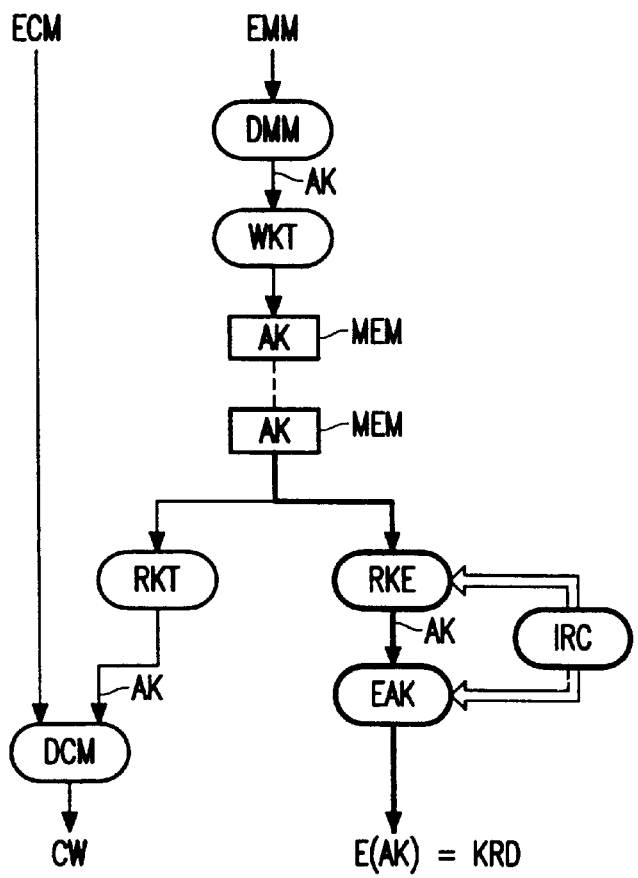
FIG. 2a is a functional diagram illustrating operations relating to recording in a first implementation of the FIG. 1 conditional access system.
Figure 2B:
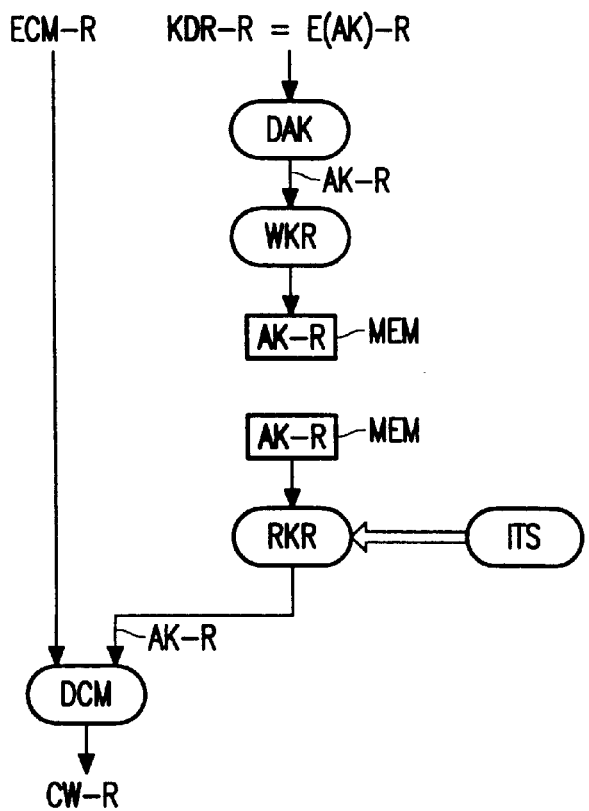
FIG. 2b is a functional diagram illustrating operations relating to play-back in the first implementation of the FIG. 1 conditional access system.

FIGS. 2a and 2b illustrate operations performed in the security device SCD, in a first implementation of the FIG. 1 pay-TV system. In FIG. 2a, the operations which are required to view a pay-TV program at the time of its transmission are indicated in relatively thin lines. A decryption DMM of an entitlement management message EMM, conveyed to the security device SCD, provides an authorization key AK. A writing WKT of the authorization key AK into the memory MEM makes that the authorization key AK available in the security device SCD, at least until a new entitlement management message EMM is conveyed. A reading RKT of the authorization key AK from the memory MEM, causes the authorization key AK to be used in a decryption DCM of the entitlement control messages ECM. The decryption DCM provides the proper control word CW, which is necessary for descrambling the scrambled video signal SV in the descrambler DSC shown in FIG. 1.

In FIG. 2a, those operations which relate to a recording of the pay-TV program, are indicated in solid lines. An identification of recording IRC of the pay-TV program is a condition for an encryption EAK of the authorization key AK, which key is read from the memory MEM by means of a reading RKE. The encryption EAK provides an encrypted authorization key E(AK). The encrypted authorization key E(AK) constitutes the key-related data KRD which is recorded on the video tape recorder VTR together with the transport stream TS as shown in FIG. 1. When the recorded pay-TV program is played back, a recorded encrypted authorization key E(AK)-R, which is equivalent to the key-related data KRD-R in FIG. 1, is supplied to the security device SCD via the multiplexer/demultiplexer MDX.

FIG. 2b illustrates those operations which are performed for viewing the recorded pay-TV program. A decryption DAK retrieves a recording authorization key AK-R from the encrypted authorization key E(AK). The recording authorization key AK-R is identical to the authorization key AK which was present in the memory MEM at the time of transmission of the recorded pay-TV program. A writing WKR of the recording authorization key AK-R in the memory MEM makes the recording authorization key AK-R available in the security device SCD, at least until viewing of the recorded pay-TV program has ended. An identification of time-shifted viewing ITS is a condition for a reading RKR of the recording authorization key AK-R from the memory MEM. The reading RKR causes the recording authorization key AK-R to be used in a decryption DCM of recorded entitlement control messages ECM-R. The decryption DCM in FIG. 2b provides control words CW-R proper for descrambling the recorded scrambled video TS-R.

Figure 3A:
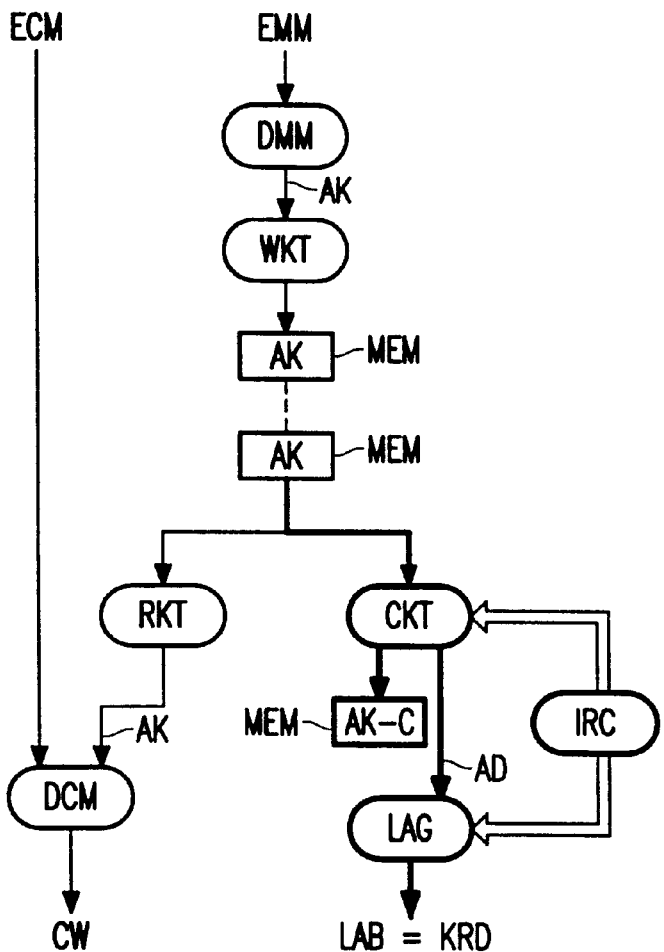
FIG. 3a is a functional diagram illustrating operations relating to recording in a second implementation of the FIG. 1 conditional access system.
Figure 3B:
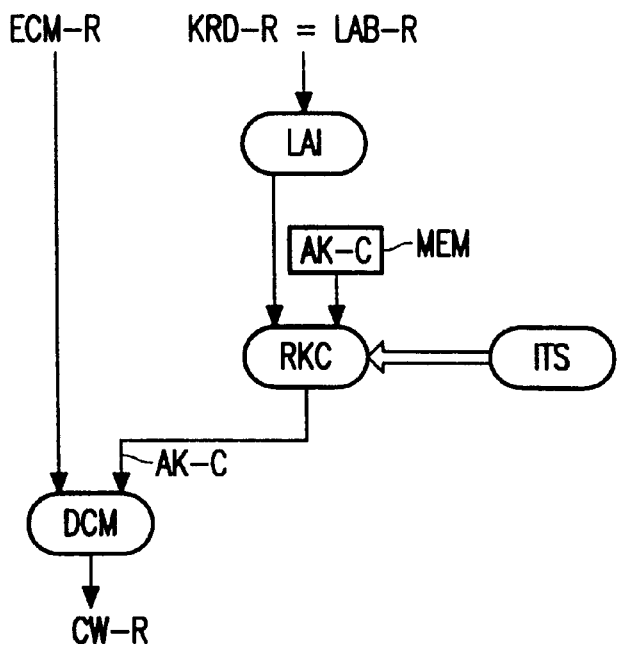
FIG. 3b is a functional diagram illustrating operations relating to play-back in the second implementation of the FIG. 1 conditional access system.

FIGS. 3a and 3b illustrate operations performed in the security device SCD, in a second implementation of the FIG. 1 pay-TV system. Relatively thin-lined operations in FIG. 3a are identical to those in FIG. 2a. In FIG. 3a, a copying CKT of the authorization key AK takes place in the memory MEM, in response to the identification of recording IRC of the pay-TV program. Accordingly, a copied authorization key AK-C is present in the memory MEM. In contrast to the authorization key AK, the copied authorization key AK-C is, in principle, not overwritten when a new entitlement management message EMM is conveyed to the security device SCD. A label generation LAG transforms an address AD, under which the copied authorization key AK-C is stored in the memory MEM, into a label LAB. The label LAB constitutes the key-related data KRD, which is recorded together with the transport stream TS, as shown in FIG. 1. When the recorded pay-TV program is played back, a recorded label LAB-R, which is equivalent to the recorded key-related data KRD-R in FIG. 1, is supplied to the security device SCD via the multiplexer/demultiplexer MDX.

FIG. 3b illustrates operations relating to the play-back of the recorded pay-TV program. A label interpretation LAI retrieves the address AD under which the copied authorization key AK-C is stored in the memory MEM. Subject to the identification of time-shifted viewing ITS, a reading RKC of the copied authorization key AK-C takes place. The reading RKC causes the copied authorization key AK-C to be used in a decryption DCM of the recorded entitlement control messages ECM-R. The decryption DCM in FIG. 3b provides control words CW-R, which are proper for descrambling the recorded scrambled video signal SV-R.

Figure 4A:
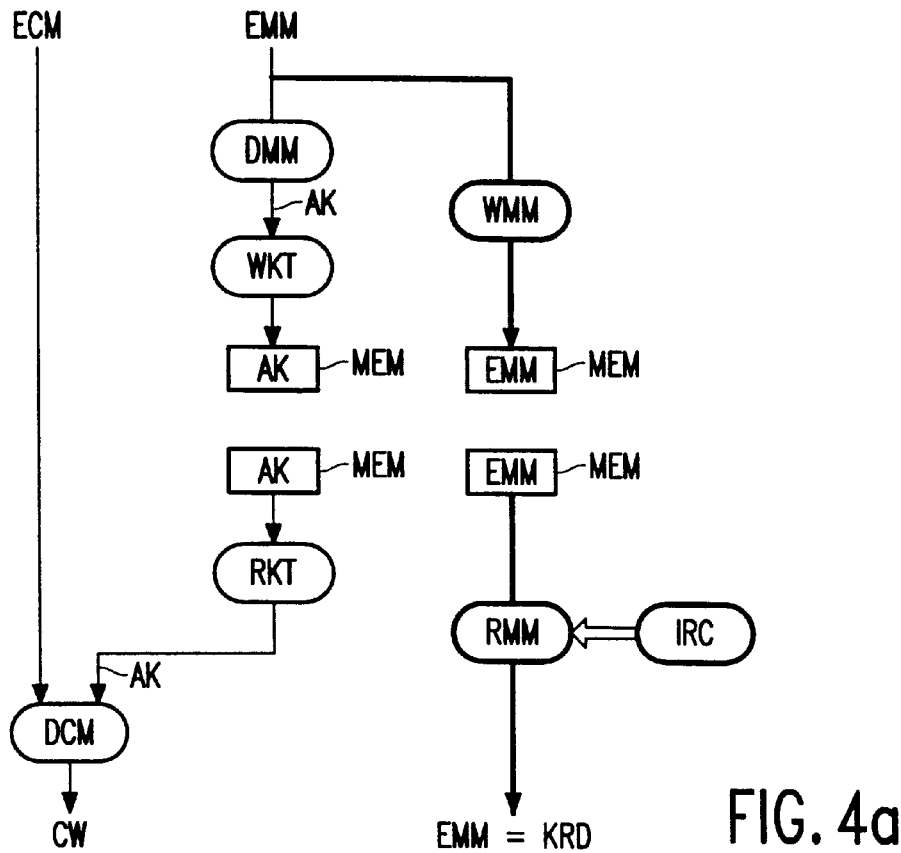
FIG. 4a is a functional diagram illustrating operations relating to recording in a third implementation of the FIG. 1 conditional access system.
Figure 4B:
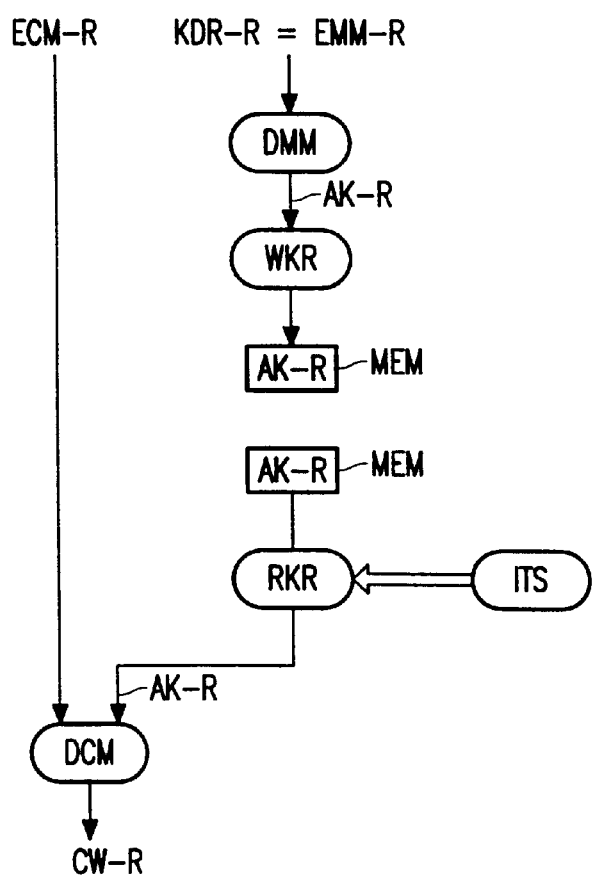
FIG. 4b is a functional diagram illustrating operations relating to play-back in the third implementation of the FIG. 1 conditional access system.

FIGS. 4a and 4b illustrate operations performed in the security device SCD, in a third implementation of the FIG. 1 pay-TV system. Relatively thin-lined operations in FIG. 4a are identical to those in FIG. 2a. In FIG. 4a, a writing WMM of an entitlement management message EMM, which is conveyed to the security device SCD, into the memory MEM takes place. Accordingly, the entitlement management message EMM is stored in the memory MEM of the security device SCD. It should be noted that this is not standard practice. Normally, the result of the decryption DMM of the entitlement management message EMM is stored, which result comprises the authorization key AK, but the entitlement management message EMM itself is not stored. Subject to the condition of the identification of recording IRC of the pay-TV program, a reading RMM of the entitlement management message EMM, stored in the memory MEM, takes place. The reading RMM causes the entitlement management message EMM to be supplied as key-related data KRD to the multiplexer/demultiplexer MDX shown in FIG. 1, such that the entitlement management message EMM is recorded together with the transport stream TS.

FIG. 4b illustrates operations performed for playing back the recorded pay-TV program. Subject to the condition of the identification of time-shifted viewing ITS of the pay-TV program, the decryption DMM of a recorded entitlement management message EMM-R takes place. The decryption DMM retrieves the recording authorization key AK-R from the recorded entitlement management message EMM-R. The other operations shown in FIG. 4b are identical to those in FIG. 2b.

The following remarks are made with respect to the three above-described implementations. First, the decryptions DCM shown in FIGS. 2b, 3b and 4b are identical in operation to those shown in FIG. 2a, 3a and 4a. The only difference is the moment at which they are executed, namely during play-back or during transmission of the relevant pay-TV program, respectively.

Secondly, in the first and third implementation, illustrated in FIGS. 2a and 2b and FIGS. 4a and 4b, respectively, the authorization key AK is stored in an encrypted form outside the security device SCD. In the first embodiment, the authorization key AK is encrypted in the security device SCD. A recording key can be used to encrypt the authorization key AK, which recording key may be unique to the security device SCD. In the third embodiment, the encryption of the authorization key AK at the transmitting end, resulting in an entitlement management message EMM, is effectively used. Thus, the decryption DMM of the key-related data KRD, illustrated in FIG. 4b, is identical to the decryption DMM in FIG. 4a.

Thirdly, it is possible to include recording entitlements in the above implementations to allow or inhibit a recording of any pay-TV program. For example, the output of key-related data KRD by the security device SCD can be made subject to the condition that the receiving end RE is entitled to record the pay-TV program concerned. This does not exclude the entitlement to view the pay-TV program at the moment of transmission, i.e. only time-shifted viewing is inhibited. For example, the transmitting end TE may convey the recording entitlements similar to direct viewing entitlements, namely by means of entitlement management messages EMM.

Fourthly, the indication of time-shifted viewing ITS can be derived from time-stamped messages in the transport stream TS. For example, the entitlement control messages ECM may comprise such time-stamped messages. Accordingly, a time check facility is provided for the FIG. 1 pay-TV system. If the security device SCD is equipped with an internal clock, it can tell whether a transport stream TS for direct viewing, or a recorded transport stream TS-R for time-shifted viewing, is processed in the settop box STB. Moreover, it can determine the age of the recording and use this information to decide whether viewing is allowed or not allowed.

Fifthly, the transport stream TS may comprise data identifying the pay-TV program from which it stems. For example, the entitlement control messages ECM may include data which tells which pay-TV program is multiplexed with these entitlement control messages ECM. Then, the security device SCD can determine, from the entitlement control messages ECM it receives, which pay-TV program is being supplied to the descrambler DSC.

The invention, which is applied in the pay-TV system described above, provides the advantage that the pay-TV operator is effectively the "master" of the recorded pay-TV program. This means that the pay-TV operator can inhibit any viewing of the recorded pay-TV program if he so desires. The control words CW-R, needed for viewing the recorded pay-TV program, are retrieved from the recorded entitlement control messages ECM-R and the recorded key-related data KRD-R, in the security device SCD. It is the TV operator who controls the operations in the security device SCD. Thus, he may impose conditions, which must be fulfilled, in order that the proper control words CW-R are supplied to the descrambler DSC.

For example, the pay-TV operator may determine the number of times the recorded pay-TV program may be viewed, in the following manner. The pay-TV operator may convey an entitlement management message EMM to the security device SCD, which sets the condition "no more than 5 viewings of the pay-TV program recorded". To count the number of viewings, the security device SCD may comprise software for program identification and counting. If the security device SCD establishes that a pay-TV program is to be viewed for the sixth time, it inhibits the supply of control word CW-R to the descrambler DSC.

Another condition, which the pay-TV operator may impose, is the period during which the pay-TV program may be viewed. Again, this condition may be conveyed to the security device SCD by means of an entitlement management message EMM. The security device SCD may comprise software to determine the age of the program which is supplied to the security device SCD. The above-mentioned time-stamped messages, for example comprised in the entitlement control messages ECM, can be used for that purpose.

The invention further provides the advantage that, in principle, the recorded pay-TV program can be viewed only if the security device SCD which was used for recording is available. The key-related data KRD which, together with the transport stream TS, is stored on tape only make sense to the security device SCD which has produced the key-related data KRD. It is highly unlikely, if not excluded, that another security device SCD is capable of deriving the proper authorization key AK from the key-related data KRD when the recorded pay-TV program is played back. Thus, if the proprietor of the receiving RE shown in FIG. 1 lends a taped pay-TV program to a friend of his, this friend can only view the pay-TV program, if the proprietor also lends his security device SCD to his friend. If he does not lend his security device SCD, the friend in question must request the pay-TV operator to grant him a viewing entitlement.

In addition, the invention provides the advantage that the recorded pay-TV programs are copyright-protected. It will be clear from the foregoing that any copy of the recorded pay-TV program can be viewed only if the security device SCD is available which was used in recording the original.

In summary, the invention provides a time-shifted viewing functionality to a pay-TV system, while avoiding that this functionality substantially affects the security of the pay TV-system.

It will be evident that numerous embodiments and implementations, other than those which have been presented by way of example, are within the scope of the invention as claimed.

Conditional access data, other than the authorization key AK, can be processed similar to the authorization key AK in the above-described embodiments. Such conditional access data may pertain, for example, to the right of using the authorization key AK, generally stated, the entitlements at the receiving end RE. Referring to FIG. 2a, entitlements can be encrypted in the security device SCD for recording, together with the key-related data KRD and the transport stream TS on the video tape recorder VTR shown in FIG. 1.

There are numerous ways of physically spreading functional elements among various units. In this respect, FIG. 1 is very diagrammatic and represents only one possible embodiment of a conditional access system according to the invention. For example, all functional elements of the receiving end RE, shown in FIG. 1, may be integrated in the video tape recorder VTR. In an alternative embodiment, the security device SCD can be implemented as a smart card which is detachable from the video tape recorder VTR. In a further alternative embodiment, the secure device SCD may be integrated in the settop box STB. There may also be special units dedicated to recording and further units for other purposes.

Instead of storing the key-related data KRD together with the transport stream TS on the video tape recorder VTR, the key-related data KRD may be stored elsewhere. For example, the key-related data KRD can be stored in a memory (not shown) which is incorporated in the settop box STB. Of course, provisions have to be made in this embodiment, for linking the key-related data KRD, stored in the settop box STB, to the recorded pay-TV program.

Instead of a video tape recorder VTR, any other recording medium, for example optical or magnetic disks, may be used. The invention can be implemented by means of discrete hardware or by means of a processor fed by suitable software. Any reference signs in a claim should not be construed as limiting the claim concerned.

In summary, the following has been described in this specification. In a conditional access system, transmitted information is recorded in a scrambled form SV. Accordingly, any access to the recorded information SV is subject to the condition that proper control word(s) CW are available. To enable access to the recorded information SV, control word regenerating data ECM, KRD is stored. The proper control word(s) CW cannot easily be derived from this control word regenerating data ECM, KRD. However, security device SCD is capable of retrieving the proper control word(s) CW from the control word regenerating data ECM, KRD. A system effectively masters operations carried out in the security device SCD. Accordingly, if the system operator so desires, he may inhibit retrieval of the control word(s) CW and, consequently, prevent access to the recorded information SV.

I claim:

1. A conditional access system, comprising:
    descrambler means for converting scrambled information into descrambled information depending on control words;
    security means for supplying the control words to the descrambler means so that the descrambler means perform the conversion;
    means for supplying control word generation data, different from the control words, for recording on a storage media along with the scrambled information;
    and generation means for providing the control words depending on the recorded control word generation data when the scrambled information along with the generation data is read from the storage media.

2. The system of claim 1 in which the security means and generation means are incorporated in a security device.

3. The system of claim 2 in which the security device is detachable and the system further comprises holder means for holding the attached security device.

4. The system of claim 1 in which: the means to supply control word generation data encodes control words into the generation data; and the generation means decodes the control words to retrieve the control words from the generation data.

5. The system of claim 1 in which the security means are for receiving recording-entitlement information and controlling the generation means to supply code word generation data depending on receiving the recording-entitlement information.

6. The system of claim 1 in which the security means are for receiving reading-entitlement information and controlling the supplying means to supply the code words depending on the security means receiving the reading-entitlement information.

7. A security device, comprising:

means for providing control words to a descrambler for converting scrambled information into descrambled information depending on the control words; and means for supplying control word generation data, that is different than the control words, for recording along with the scrambled information on storage media;

and in which the means for providing control words are for providing the control words depending on the control word generation data read from the storage media.

8. A recording medium, comprising:

scrambled information; and control word generation means for providing control words to descramble the scrambled information and which are different from the control words.

9. A method of time-shifted conditional access to scrambled information, comprising:

providing scrambled information;

providing control word generation data;

recording the scrambled information along with the control word generation data onto storage media;

reading the scrambled information along with the control word generation data from the storage media;

supplying the recorded scrambled information to a descrambler;

generating control words depending on the control word generation data;

supplying the control words to the descrambler; and unscrambling the scrambled information depending on the control words.

10. The method of claim 9 in which: the method further comprises providing recording entitlement information; and producing control word generating data depends on receiving the recording entitlement information.

11. The method of claim 9 in which: the method further comprises providing reading entitlement information; and supplying control words depends on receiving the recording entitlement information.

12. A system for programming a programmable conditional access system, comprising:

apparatus to provide descrambler means for converting scrambled information into descrambled information depending on control words;

apparatus to provide security means for supplying the control words to the descrambler means so that the descrambler means perform the conversion;

apparatus to provide means for supplying control word generation data, different from the control words, for recording on a storage media along with the scrambled information;

and apparatus to provide generation means for providing the control words depending on the recorded control word generation data when the scrambled information along with the generation data is read from the storage media.

13. The system of claim 12 in which the system consists essentially of programmed computer media.

14. A signal comprising:

scrambled information for unscrambling by control words generated from control word generating data; and recording entitlement information for allowing or preventing recording of the control word generating data different from the control words, along with scrambled information.

15. A conditional access system, comprising:

de-scrambler means for converting scrambled information into de-scrambled information depending on key words;

security means for providing the key words to the de-scrambler means depending on generation data that is independent of the scrambled information; and means for reading or recording the scrambled information and the generation data together on storage media.

16. The system of claim 15 in which the scrambled information includes code words and the security means are adapted to decrypt the code words using the generation data to produce the key words.

17. The system of claim 1 in which the scrambled information includes encoded code words and the generation means are adapted to decode the code words depending on the generation data.

* * * * *